United States Patent [19]

Peters

[11] 4,325,807

[45] Apr. 20, 1982

[54] MULTIPLE STAGE HYDROCARBON CONVERSION WITH GRAVITY FLOWING CATALYST PARTICLES

[75] Inventor: Kenneth D. Peters, Elmhurst, Ill.

[73] Assignee: UOP Inc., Des Plaines, Ill.

[21] Appl. No.: 222,467

[22] Filed: Jan. 5, 1981

[51] Int. Cl.$^3$ .............................................. C10G 35/04
[52] U.S. Cl. ........................................ 208/64; 208/79; 208/80; 208/156; 208/169; 585/441; 585/449
[58] Field of Search ....................... 208/64, 65, 79, 80, 208/156, 169; 585/441, 449

[56] References Cited

U.S. PATENT DOCUMENTS 4,104,149 8/1978 Veinerman et al. .................. 208/64

Primary Examiner—Curtis R. Davis
Attorney, Agent, or Firm—James R. Hoatson, Jr.; Robert W. Welch; William H. Page, II

[57] ABSTRACT

A multiple stage catalytic conversion system in which a hydrocarbonaceous charge stock and hydrogen flow serially through a plurality of catalytic reaction zones, in each of which the catalyst particles are downwardly movable via gravity flow. At least four reaction zones are utilized, with the fresh feed and hydrogen reactant stream being split between the first and second reaction zones. The flow of that portion introduced into the second zone is restricted. The effluent stream from the first reaction zone is also restricted and then combined with the effluent from the second reaction zone. One portion of the combined effluent streams is introduced into the third reaction zone, and the remaining portion is restricted in flow, combined with the effluent stream from said third reaction zone, and introduced into the fourth reaction zone. This technique decreases the mass flow to the first three zones and increases the pressure drop experienced within the entire conversion system, thus serving to alleviate the problems associated with the occurrence of stagnant catalyst areas as a result of catalyst particles being "pinned" within a reaction zone and thus unable to assume a downward, gravity flow pattern. Restriction of the second zone feed and first reaction zone effluent insures a higher pressure in the first zone.

11 Claims, 1 Drawing Figure

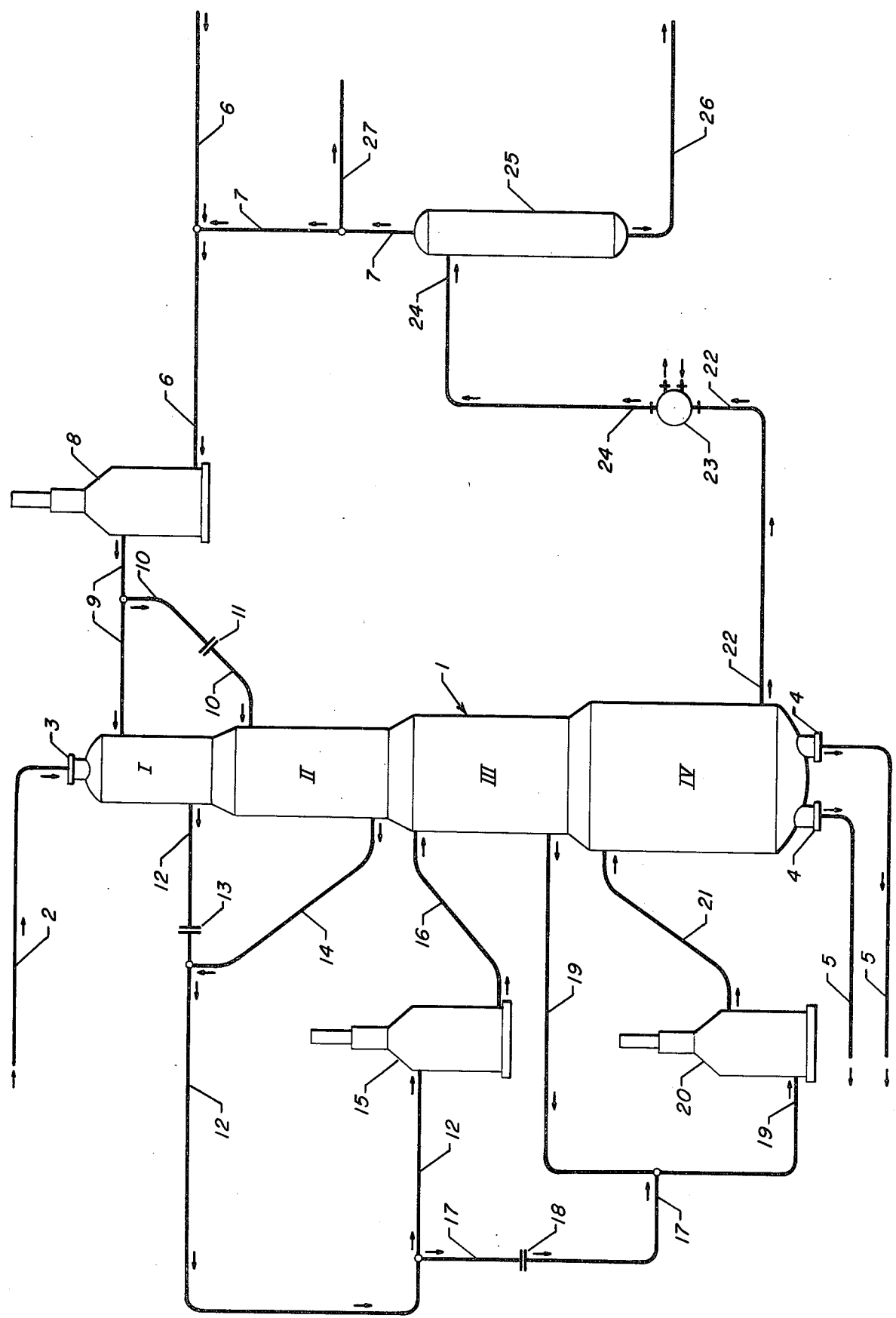

MULTIPLE STAGE HYDROCARBON CONVERSION WITH GRAVITY FLOWING CATALYST PARTICLES

My invention is directed toward an improved technique for effecting the catalytic conversion of a hydrocarbonaceous reactant stream in a multiple stage reaction system wherein (i) the reactant stream flows serially through the plurality of reaction zones and, (ii) the catalyst particles are movable through each reaction zone via gravity flow. More particularly, the described processing technique is adaptable for utilization in vapor phase systems wherein the conversion reactions are principally endothermic, and where the flow of the hydrocarbonaceous reactant stream, with respect to the downward direction of catalyst particle movement is cocurrent and essentially radial.

Various types of multiple stage reaction systems have found widespread utilization throughout the petroleum and petrochemical industries for effecting a variety of reactions, and especially hydrocarbon conversion reactions. Such reactions are either exothermic, or endothermic, and encompass both hydrogen-producing and hydrogen-consuming processes. Multiple stage reaction systems generally take one of two forms: (1) a side-by-side configuration with intermediate heating between the reaction zones, and wherein the reactant stream or mixture flows serially from one zone to another zone; and, (2) a stacked design wherein a single reaction chamber, or more, contains the multiple catalytic contact stages. As applied to petroleum refining, such reactor systems have been employed to effect numerous hydrocarbon conversion reactions including those which are prevalent in catalytic reforming, alkylation, ethylbenzene dehydrogenation to produce styrene, other dehydrogenation processes, etc. My invention is specifically intended for utilization in those processes where the conversion reactions are effected in vapor phase, where catalyst particles are movable via gravity flow, where the reaction system exists in side-by-side relation, where two or more catalytic contact zones are "stacked", or where one or more additional reaction zones are disposed in a side-by-side relationship with the stack.

Since catalyst particles which are movable through a reaction system by way of gravity flow are necessarily moving in a downwardly direction, the present technique contemplates the withdrawal of catalyst particles from a bottom portion of one reaction zone and the introduction of fresh, or regenerated catalyst particles into the top portion of a second reaction zone. My technique is also intended to be applied to those reaction systems wherein the catalyst is disposed as an annular form bed and the flow of the reactant stream, serially from one zone to another reaction zone, is perpendicular, or radial to the movement of catalyst particles.

A radial flow reaction system generally consists of tubular form sections, having varying nominal cross-sectional areas, vertically and coaxially disposed to form the reaction vessel. Briefly, the system consists of a reaction chamber containing a coaxially disposed catalyst retaining screen, having a nominal, internal cross-sectional area less than said chamber, and a perforated centerpipe having a nominal, internal cross-sectional area which is less than the catalyst retaining screen. The reactant stream is introduced, in vapor phase, into the annular form space created between the inside wall of the chamber and the outside surface of the catalyst retaining screen. The latter forms an annular form, catalyst holding zone with the outside surface of the perforated centerpipe; vaporous reactant flows laterally and radially through the screen and catalyst zone into the centerpipe and out of the reaction chamber. Although the tubular form configuration of the various reaction zone components may take any suitable shape—e.g. triangular, square, oblong, diamond, etc.—many design, fabrication and technical considerations dictate the advantages of utilizing components which are substantially circular in cross-section.

Illustrative of a multiple stage stacked reaction zone system is that shown in U.S. Pat. No. 3,706,536 issued Dec. 19, 1972. Transfer of the gravity flowing catalyst particles, from one reaction zone to another, as well as introduction of fresh catalyst particles and the withdrawal of "spent" catalyst particles, is effected through the utilization of a plurality of catalyst transfer conduits. Experience in the use of such systems, as well as those where the reaction zones are disposed in a side-by-side relationship indicates that a high vapor flow through the annular form catalyst holding sections results in catalyst particles being "pinned" in the vicinity of the perforated centerpipe. Created thereby are stagnant catalyst areas where the catalyst particles are prevented from assuming the gravity flow pattern.

A principal object of my invention is to prevent, or alleviate catalyst "pinning" in a hydrocarbon conversion system in which catalyst particles are movable via gravity flow. A corollary objective is to provide an improved processing technique for utilization in a multiple stage, stacked reactor system in which catalyst particles in each reaction zone are movable via gravity flow, and catalyst particles flow from one zone to the next succeeding reaction zone by way of gravity flow.

Another object afforded through the use of my inventive concept is improvement in a substantially endothermic hydrocarbon conversion system effected in vapor phase and wherein the catalyst particles are downwardly movable via gravity flow.

Therefore, in one embodiment, my invention is intended for utilization in a multiple stage catalytic conversion system wherein, (1) heated hydrocarbonaceous charge stock and hydrogen flow serially through a plurality of catalytic reaction zones; (2) reaction product effluent is subjected to interstage heating between successive reaction zones; and, (3) catalyst particles are movable through each reaction zone via gravity flow, and encompasses the method of effecting the conversion of said charge stock which comprises the sequential steps of heating said charge stock and hyrogen, and introducing a first portion thereof into a first reaction zone maintained at hydrocarbon conversion conditions; restricting the flow of a second portion of the heated charge stock and hydrogen, and introducing said second portion into a second reaction zone maintained at hydrocarbon conversion conditions; restricting the flow of the effluent from said first reaction zone and combining therewith the effluent from said second reaction zone; heating a first portion of the combined effluents from said first and second reaction zones and introducing said first portion into a third reaction zone maintained at hydrocarbon conversion conditions; restricting the flow of a second portion of said combined effluents, and admixing therewith the effluent from said third reaction zone; heating the resulting mixture and introducing the same into a fourth reaction zone at hydrocarbon conversion conditions; separating the effluent from the last reaction zone in said system to provide (i) a normally liquid product stream and, (ii) a hydrogen-rich vaporous phase, and recycling at least a portion of said vaporous phase to said first reaction zone; at least periodically withdrawing catalyst particles from the last reaction zone in said system; and, at least periodically introducing fresh or regenerated catalyst particles into the first reaction zone in said system.

More specifically, my invention is directed toward a multiple stage hydrocarbon catalytic reforming process which comprises the sequential steps of heating a mixture of a hydrocarbon charge stock and hydrogen, and introducing a first portion of the heated mixture into a first reaction zone through which catalyst particles are movable via gravity flow; restricting the flow of a second portion of said heated mixture and introducing the same into a second reaction zone through which catalyst particles are movable via gravity flow; restricting the flow of the effluent from said first reaction zone and combining therewith the effluent from said second reaction zone; heating a first portion of the combined effluent streams and introducing said first portion into a third reaction zone through which catalyst particles are movable via gravity flow; restricting the flow of a second portion of the combined effluent streams, and admixing therewith the effluent stream from said third reaction zone; heating the resulting mixture and introducing the same into a fourth reaction zone through which catalyst particles are movable via gravity flow; separating the resulting fourth catalytic reaction zone effluent to provide (i) a normally liquid product stream and (ii) a vaporous hydrogen-rich phase, and recycling at least a portion of said vaporous phase to combine with said hydrocarbon charge stock; at least periodically withdrawing catalyst particles from said fourth reaction zone; and at least periodically introducing fresh or regenerated catalyst particles into said first reaction zone.

This embodiment is further characterized in that the four reaction zones are disposed as a vertical stack having a common vertical axis, and catalyst particles are movable from one reaction zone to the next succeeding reaction zone via gravity flow.

These, as well as other objects and embodiments will become evident from the following, more detailed description of the present hydrocarbon conversion process. In one such other embodiment, each restriction of effluent flow produces an additional reactor system pressure drop in the range of from about 1 to about 10 psi.

It must be recognized and acknowledged that various types of hydrocarbon conversion processes utilize multiple stage reactor systems, either in a side-by-side configuration, as a vertically disposed stack, or a combination of a stacked system in side-by-side relation with one or more separate reaction zones. As applied to petroleum refining, such systems may be employed in a wide variety of hydrocarbon conversion reactions. While my inventive concept is adaptable to many conversion reactions and processes, through the reactor system of which the catalyst particles are movable via gravity flow, the same will be further described in conjunction with the well-known endothermic catalytic reforming process.

Historically, catalytic reforming was effected in a nonregenerative, fixed bed system comprising a plurality of reaction zones disposed in side-by-side relation. When the catalytic composite became deactivated to the extent that continuous operation was no longer economically feasible, the entire unit was shut down and the catalyst regenerated in situ. Of a more recent vintage, was the so-called "swing bed" system in which an extra reactor was substituted for one which was due to be placed off stream for regeneration purposes. Still more recently, multiple stage reactor systems have been provided in which the catalyst particles flow, via gravity, through each reaction zone. In a "stacked" system, the catalyst particles also flow downwardly from one catalyst-containing zone to another, and ultimately transfer to a suitable regeneration system also preferably functioning with a downwardly moving bed of catalyst particles. In effect, the catalyst particles are maintained from one section to another in a manner such that the flow of catalyst particles is continuous, at frequent intervals, or at extended intervals with the movement being controlled by the quantity of catalyst withdrawn from the last of the series of individual reaction zones.

The existence of stagnant catalyst areas, resulting when catalyst particles are pinned to the perforated centerpipe by the lateral/radial flow across the annular form catalyst bed, is recognized in U.S. Pat. No. 4,104,149. The problem is substantially obviated by the device of splitting the reactant stream between the first two reaction zones while restricting flow to the second of said zones. However, the patented process does not anticipate a recurrence of the pinning problem in a subsequent reaction zone as provided for by the process of the present invention. The last mentioned pinning problem is most frequently encountered under conditions of increased liquid hourly space velocities, that is, when the reactant stream throughput is increased for a given volume of catalyst.

To reiterate briefly, the process encompassed by my inventive concept is suitable for use in hydrocarbon conversion systems which are characterized as multiple stage, and in which catalyst particles are movable via gravity flow through each reaction zone. Furthermore, the present invention is principally intended for utilization in reactor systems where the principal reactions are endothermic and are effected in vapor phase. Although the following discussion is specifically directed toward catalytic reforming of naphtha boiling range fractions, there is no intent to so limit the present invention. Catalytic reforming, as well as many other processes, has experienced several phases of development currently terminating in the system in which the catalyst beds assume the form of a descending column in one or more reaction vessels. Typically, the catalysts are utilized in substantially spherical form having a nominal diameter ranging from about 1/32-inch to about 5/32-inch in order to offer free-flow characteristics which will neither bridge, nor block the descending column, or columns of catalyst within the overall system.

In one such multiple stage system, the reaction chambers are vertically stacked and a plurality, generally from about 6 to about 16, of relatively small diameter conduits are employed to transfer catalyst particles from one reaction zone to the next lower reaction zone (via gravity flow) and ultimately to withdraw catalyst particles from the last reaction zone. The latter are usually transported to the top of a catalyst regeneration facility, also functioning with a descending column of catalyst particles; regenerated catalyst particles are then transported to the top of the upper reaction zone of the stack. In order to facilitate and enhance gravity flow within each reaction vessel, as well as from one zone to another, it is particularly important that the catalyst particles have a relatively small nominal diameter, and one which is preferably less than about 5/32-inch. In a conversion system having the individual gravity flow reaction zones in side-by-side relationship, catalyst transport vessels (of the type shown in U.S. Pat. No. 3,839,197) are employed in transferring the particles from the bottom of one zone to the top of the succeeding zone, and from the last reaction zone to the top of the regeneration facility.

Catalytic reforming of naphtha boiling range hydrocarbons, a vapor phase operation, is effected at conversion conditions including catalyst bed temperatures in the range of about 700° F. to about 1020° F.; judicious and cautious techniques generally dictate that catalyst temperatures not substantially exceed a level of about 1020° F. Other conditions include a pressure from about 50 psig. to about 1000 psig., a liquid hourly space velocity (defined as volumes of fresh charge stock per hour, per volume of total catalyst particles) in the range of about 0.2 to about 10.0 and a hydrogen to hydrocarbon mole ratio generally in the range of about 0.5:1.0 to about 10.0:1.0. As those possessing the requisite skill in the petroleum refining art are aware, the described continuous regenerative reforming system offers numerous advantages when compared to the prior art fixed bed systems. Among these is the capability of efficient operation at comparatively lower pressures—e.g. 50 psig. to about 200 psig.—and higher liquid hourly space velocities—e.g. about 3.0:1.0 to about 8.0:1.0. As a result of continuous catalyst regeneration, higher consistent inlet catalyst bed temperatures can be maintained—e.g. 950° F. to about 1010° F. Furthemore, there is afforded a corresponding increase in both hydrogen production and hydrogen purity in the recycled vaporous phase from the product separation facility.

Catalytic reforming reactions are varied, and include dehydrogenation of naphthenes to aromatics, dehydrocyclization of paraffins to aromatics, hydrocracking of long chain paraffins into lower boiling, normally liquid material and, to a certain extent, the isomerization of paraffins. These reactions, the net result of which is endothermicity, with respect to the overall reaction system, are effected through the utilization of one or more Group VIII noble metals (e.g. platinum, iridium, rhodium, palladium) combined with a halogen (e.g. chlorine and/or fluorine) and a porous carrier material such as alumina. Relatively recent investigations have indicated that more advantageous results are attainable and enjoyed through the cojoint use of a catalytic modifier; these have been selected from the group of cobalt, nickel, gallium, germanium, tin, rhenium, vanadium and mixtures thereof, etc. Regardless of the selected catalytic composite, the ability to attain the advantage over the common fixed bed systems is greatly dependent upon achieving acceptable catalyst particle flow downwardly through the system. Not only must this be substantially uniform throughout the cross-section of the annular catalyst bed, but stagnant areas of catalyst must be maintained at the most achievable minimum.

Catalytic reforming is a well-known process which has been thoroughly described in the literature, having been a commercially important tool of the petroleum refining industry for about three decades. One of the many things gleaned from the vast amount of catalytic reforming experience and resulting knowledge, is the soundness of utilizing multiple stages, each of which contains a different quantity of catalyst, generally expressed as volume percent. The reactant stream, hydrogen and the hydrocarbon feed, flow serially through the reaction zones in order of increasing catalyst volume with, of course, interstage heating. In a three reaction zone system, typical catalyst loadings are: first, 10% to about 30%; second, from about 20% to about 40%; and, third, from about 40% to about 60%. With respect to a four reaction zone system, suitable catalyst loadings would be: first, 5% to about 15%; second, 15% to about 25%; third, 25% to about 35%; and, fourth, 35% to about 50%. Unequal catalyst distribution, increasing in the serial direction of reactant stream flow, facilitates and enhances the distribution of the reactions as well as the overall heat of reaction.

As hereinbefore stated, the pinning of catalyst particles to the perforated centerpipe stems primarily from the high vapor velocity laterally across the annular form catalyst holding zone, this adverse effect increasing in degree as the cross-sectional area and length of the catalyst bed decreases. In multiple stage catalytic reforming systems, therefore, the effect is most pronounced in the first and second reaction zones, having the smaller annular cross-sectional areas, somewhat less in the third reaction zone and of a relatively minor consequence in the fourth reaction zone due to its length and larger cross-sectional catalyst area. Splitting the hydrocarbon/hydrogen feed between the first and second reaction zones serves to decrease the mass flow to each of said reaction zones. Preferably, from about 30 to about 50 wt.% of said feed is introduced into the first reaction zone, and from about 50 to about 70 wt.% is introduced into the second reaction zone, the greater quantity being introduced into the second reaction zone. The present invention is particularly concerned with an aggravation of the pinning problem in the third reaction zone, a situation most frequently encountered under conditions of relatively high liquid hourly space velocities. This pinning problem is substantially obviated by introducing only a portion of the combined effluent streams from the first two reaction zones into the third reaction zone. The remaining portion is admixed with the effluent from the third reaction zone and introduced into the fourth reaction zone. From about 60 to about 80 wt.% of the combined effluent streams from the first two reaction zones is preferably introduced into the third reaction zone, and from about 20 to about 40 wt.% into the fourth reaction zone, combining first with the third reaction zone effluent stream. Restricting the flow of effluent from the first reaction zone, the flow of the reactant stream to the second reaction zone, and that portion of the combined effluent streams introduced into the fourth reaction zone, insures a suitable pressure drop across the multiple stage reactor system and guarantees that the desired amount of material be sent to each reaction zone.

The flow restrictions of the various reaction zone effluents may be effected in any suitable manner which produces, or results in an additional pressure drop increase, for the overall reactor circuit, of from about 1 to about 10 psi. for each such restriction. Similarly, it is intended that the restriction of the flow of the fresh feed and hydrogen to the second zone produces an additional pressure drop increase of about 1 to about 10 psi. Flow restriction may be accomplished through the use of venturi tubes, control valves, orifice plates, etc.; the orifice plate is particularly preferred for the vapor phase operation. For the most part, catalyst pinning is a function of two dependent variables: (1) the vapor mass flow rate; and, (2) the density of the vapors which flow laterally through the annular form catalyst bed into and through the perforated centerpipe. To reduce, or eliminate catalyst pinning, for a given design flow of fresh feed charge stock, the rate of hydrogen-rich gas recycle to the system must be reduced. This, however, reduces the total mass flow to a given reaction zone, which, in turn, reduces the reactor system pressure drop. Of course, the effective pressure in the initial reaction zone, in which catalyst pinning is most prevalent and troublesome, is reduced; a corresponding reduction in vapor density ensues. The utilization of restriction orifices (or other suitable devices) as hereinabove described, increases the pressure drop in the reactor circuit; this increases the pressure in the first reaction zone and thus the density of the vapors. Higher vapor density alleviates the catalyst pinning problems. The use of restriction orifices also affords greater recycle gas flow which reduces carbonaceous material deposition in the regeneration load imposed upon the regeneration facility. Furthermore, the final reaction zone functions at a lower pressure which gives rise to a liquid yield advantage. Preferably, the restriction orifices are placed upstream of the reaction zone interheaters to decrease the heater operating pressure and increase the velocity of the reactor effluent in the heater tubes. In short, the foregoing results in decreased mass flow to the first, second and third reaction zones, increases vapor density, as well as the pressure drop throughout the reactor system, and alleviates the problems and difficulties which are associated with catalyst pinning.

In further describing the present invention, and its method of operation, reference will be made to the accompanying drawing. It is understood that the drawing is presented solely for the purposes of illustration, and the same is not intended to be construed as limiting upon the scope and spirit of my invention as defined by the appended claims. Therefore, miscellaneous appurtenances, not required for a complete understanding of the inventive concept, have been eliminated or reduced in number. Such items are well within the purview of one possessing the requisite skill in the appropriate art. The illustrated embodiment is presented as a simplified schematic flow diagram showing four reaction zones, stacked catalytic reforming system 1 having an upper first reaction zone I, two intermediate zones II and III, and a lowermost fourth reaction zone IV.

The drawing illustrates a particularly preferred embodiment in which a stacked reactor system 1 consists of four individually distinct reaction zones I, II, III and IV. These are sized as to length and annular catalyst cross-sectional area such that the distribution of the total catalyst volume is 10.0% (zone I), 15.0% (zone II), 25.0% (zone III), and 50.0% (zone IV). In a normal, substantially problem-free operation, fresh or regenerated catalyst particles are introduced through conduit 2 and inlet port 3 into the uppermost zone I and flow via gravity therefrom into reaction zone II, from zone II into zone III, from zone III into zone IV, and are ultimately withdrawn from the reactor system through a plurality of outlet ports 4 and conduits 5. Catalyst particles so removed may be transported to a continuous regeneration zone (not illustrated), or may be stored until a sufficient quantity is available for a batch-wise regeneration. The rate of catalyst flow through the stacked reactor system 1, or the period of time required for catalyst particles to be introduced into the system, traverse the four reaction zones and be withdrawn for regeneration, is determined by the rate at which the latter is effected. By monitoring various operating parameters while the system is in continuous operation, the catalyst withdrawal rate, or regeneration load, can be controlled.

The naphtha boiling range charge stock is introduced into the process by way of line 6 and admixed with a hydrogen-rich vaporous phase from line 7. Following suitable heat exchange with one or more higher temperature process streams, the mixture passes through a charge heater 8 wherein the temperature is further increased to provide the desired temperatures at the catalyst bed inlets of reaction zones I and II. Approximately 60% of the heated reactant stream in line 9 is diverted through line 10, containing orifice plate 11, and is introduced thereby into reaction zone II. The remaining approximately 40% continues through line 9 into reaction zone I. An effluent stream is recovered from reaction zone I through line 12 and an orifice plate 13, and this effluent stream is combined with the effluent stream recovered in line 14 from reaction zone II. In this illustration, the orifice plate 11 has a rating of about 8 psi, while orifice plate 13 is rated at about 4 psi. This assures a pressure drop from reaction zone I to reaction zone II sufficient to prevent vapor backup and insure proper catalyst flow between said zones.

Approximately 75% of the mixed effluent stream recovered in line 12 from reaction zones I and II, is continued through line 12 to a heater 15 wherein the temperature of said stream is increased to provide a desired inlet temperature to the catalyst bed of reaction zone III, the stream thus heated being introduced into reaction zone III by way of line 16. The remaining approximately 25% of said mixed effluent stream is diverted from line 12 into line 17. The diverted stream is passed through an orifice plate 18 in line 17 rated at about 6 psi, and then combined with the effluent in line 19 recovered from reaction zone III. The combined effluent streams are then continued through line 19 to a heater 20 wherein the combined stream is heated to provide a desired inlet temperature to the catalyst bed of the lowermost reaction zone IV. The heated stream is introduced into said reaction zone IV by way of conduit 21.

The reaction product effluent from lowermost catalytic zone IV is withdrawn by way of line 22, and is utilized as the heat exchange medium to preheat the fresh feed and recycled hydrogen in line 6. The product effluent passes into condenser 23 wherein cooling and condensation takes place at a temperature in the range of about 60° F. to about 140° F., and the mixture passes through line 24 into separation zone 25. Hydrogen-rich vaporous material is withdrawn through conduit 7, for recycle at least in part, via lines 7 and 6 to uppermost reaction zone I and intermediate zone II; excess hydrogen is withdrawn from the process through line 27, the rate being determined by suitable pressure control. The normally liquid product effluent is withdrawn by way of line 26 and introduced thereby into suitable fractionation facilities (not illustrated).

Although indicated as a single separation vessel 25 and condenser 23, it will be recognized by those possessing the requisite skill in the appropriate art that the separation of the product effluent in line 24 may be effected using an initial low pressure separator followed by a high pressure separator. Vaporous material from the low pressure separator is compressed and introduced into a high pressure cooler in admixture with the liquid material recovered from the low pressure separator. The mixture is then introduced into the high pressure separator from which the hydrogen-rich recycle vaporous phase and a normally liquid product effluent are recovered.

It is believed that the foregoing, when considered in conjunction with the accompanying drawing presents a clear understanding of the technique encompassed by the present invention. Through the implementation thereof, the catalyst pinning problem which adversely affects uniform catalyst flow characteristics throughout the reactor system is substantially alleviated.

I claim as my invention:

1. In a multiple stage catalytic conversion system wherein (1) a heated hydrocarbonaceous charge stock and hydrogen flow serially through a plurality of catalytic reaction zones, (2) reaction product effluent is subjected to interstage heating between successive reaction zones, and (3) catalyst particles are movable through each reaction zone via gravity flow, the method of effecting the conversion of said charge stock which comprises the sequential steps of:
    (a) heating said charge stock and hydrogen, and introducing a first portion thereof into a first reaction zone maintained at hydrocarbon conversion conditions;
    (b) restricting the flow of a second portion of the heated hydrocarbon charge stock and hydrogen, and introducing said second portion into a second reaction zone maintained at hydrocarbon conversion conditions;
    (c) restricting the flow of the effluent stream from said first reaction zone and combining therewith the effluent stream from said second reaction zone;
    (d) heating a first portion of the combined effluent streams and introducing said first portion into a third reaction zone maintained at hydrocarbon conversion conditions;
    (e) restricting the flow of a second portion of said combined effluent streams, and admixing therewith the effluent stream from said third reaction zone;
    (f) heating the resulting mixture and introducing the same into a fourth reaction zone maintained at hydrocarbon conversion conditions;
    (g) separating the effluent from the last reaction zone in said system to provide (i) a normally liquid product stream and (ii) a hydrogen-rich vaporous phase, and recycling at least a portion of said vaporous phase to said first reaction zone;
    (h) at least periodically withdrawing catalyst particles from the last reaction zone in said system; and,
    (i) at least periodically introducing fresh or regenerated catalyst particles into the first reaction zone in said system.

2. The method of claim 1 further characterized in that said plurality of reaction zones in said conversion system are disposed in side-by-side relationship and catalyst particles are transferred from the bottom of one reaction zone to the top of the next succeeding reaction zone.

3. The method of claim 1 further characterized in that said plurality of reaction zones in said conversion system are stacked and share a common vertical axis, and catalyst particles flow via gravity from one reaction zone to the next lower reaction zones.

4. The method of claim 1 further characterized in that said conversion system contains four reaction zones.

5. The method of claim 1 further characterized in that the restriction of the flow of the second portion of said charge stock and hydrogen produces an additional reaction system pressure drop of from about 1 to about 10 psi.

6. The method of claim 1 further characterized in that the restriction of the flow of the effluent from said first reaction zone produces an additional reaction system pressure drop of from about 1 to about 10 psi.

7. The method of claim 1 further characterized in that the restriction of the flow of the second portion of said combined effluent streams produces an additional reaction system pressure drop of from about 1 to about 10 psi.

8. A multiple stage hydrocarbon catalytic reforming process which comprises the sequential steps of:
    (a) heating a mixture of hydrocarbon charge stock and hydrogen, and introducing a first portion of the heated mixture into a first reaction zone through which catalyst particles are movable via gravity flow;
    (b) restricting the flow of a second portion of said heated mixture and introducing the same into a second reaction zone through which catalyst particles are movable via gravity flow;
    (c) restricting the flow of the effluent from said first reaction zone and combining therewith the effluent from said second reaction zone;
    (d) heating a first portion of the combined effluent streams and introducing said first portion into a third reaction zone through which catalyst particles are movable via gravity flow;
    (e) restricting the flow of a second portion of the combined effluent streams, and admixing therewith the effluent stream from said third reaction zone;
    (f) heating the resulting mixture and introducing the same into a fourth reaction zone through which catalyst particles are movable via gravity flow;
    (g) separating the resulting fourth catalytic reaction zone effluent to provide (i) a normally liquid product stream and (ii) a vaporous hydrogen-rich phase, and recycling at least a portion of said vaporous phase to combine with said hydrocarbon charge stock;
    (h) at least periodically withdrawing catalyst particles from said fourth reaction zone; and,
    (i) at least periodically introducing fresh or regenerated catalyst particles into said first reaction zone.

9. The process of claim 8 further characterized in that said reaction zones are disposed in side-by-side relationship and catalyst particles are transferred from the bottom of one reaction zone to the top of the next succeeding reaction zone, said catalyst particles being movable through each of said reaction zones via gravity flow.

10. The process of claim 8 further characterized in that said reaction zones are disposed as a vertical stack having a common axis, and catalyst particles are movable from one reaction zone to the next succeeding reaction zone, and through each of said reaction zones, via gravity flow.

11. The process of claim 8 further characterized in that each of said restrictions of flow provide an additional pressure drop of from about 1 to about 10 psi.

* * * * *